(12) United States Patent
DeWitt

(10) Patent No.: US 10,089,157 B2
(45) Date of Patent: Oct. 2, 2018

(54) AUTONOMOUS MANAGEMENT OF CONCURRENT SERVICING OF MULTIPLE CLIENTS BY AN INSTRUMENT

(71) Applicant: NATIONAL INSTRUMENTS COPORATION, Austin, TX (US)

(72) Inventor: Mark R. DeWitt, Seoul (KR)

(73) Assignee: NATIONAL INSTRUMENTS CORPORATION, Austin, TX (US)

( * ) Notice: Subject to any disclaimer, the term of this patent is extended or adjusted under 35 U.S.C. 154(b) by 203 days.

(21) Appl. No.: 14/940,370

(22) Filed: Nov. 13, 2015

(65) Prior Publication Data

US 2016/0139968 A1 May 19, 2016

Related U.S. Application Data

(60) Provisional application No. 62/080,183, filed on Nov. 14, 2014.

(51) Int. Cl.
| | |
|---|---|
| *G06F 12/14* | (2006.01) |
| *G06F 13/00* | (2006.01) |
| *G06F 9/52* | (2006.01) |
| *G06F 11/273* | (2006.01) |
| *G06F 13/40* | (2006.01) |

(52) U.S. Cl.
CPC .............. *G06F 9/528* (2013.01); *G06F 9/52* (2013.01); *G06F 9/524* (2013.01); *G06F 11/273* (2013.01); *G06F 13/4022* (2013.01)

(58) Field of Classification Search
CPC ........................................................ G06F 9/52

USPC ......................................... 710/200, 316–317
See application file for complete search history.

(56) References Cited

U.S. PATENT DOCUMENTS

| | | | | |
|---|---|---|---|---|
| 7,047,337 | B2 * | 5/2006 | Armstrong | ................ G06F 9/52 710/104 |
| 7,346,720 | B2 * | 3/2008 | Fachan | ................... G06F 9/524 707/999.008 |
| 7,590,738 | B2 * | 9/2009 | Mendonca | ............ G06F 21/604 370/390 |
| 7,898,547 | B2 | 3/2011 | Wang | |
| 8,874,167 | B2 * | 10/2014 | Qiu | ....................... H04W 48/18 370/329 |

(Continued)

*Primary Examiner* — Raymond Phan

(74) *Attorney, Agent, or Firm* — Meyertons Hood Kivlin Kowert & Goetzel, P.C.; Jeffrey C. Hood

(57) ABSTRACT

An Autonomous Concurrency Management (ACM) subsystem enables test instruments (operating as servers) to reliably and efficiently handle a variety of seamless multi-device-under-test (multi-DUT) scenarios and with minimal cooperation from the original equipment manufacturer (OEM) client software (e.g. test plans, hardware abstraction layer, etc.). Concurrency capability is built directly into the test instruments. Making the instrument based concurrency autonomous means the OEM software code base need not be specifically implemented for concurrency, potentially saving thousands of lines of OEM software code. To support basic concurrency scenarios where clients asynchronously share the instrument, as well as advanced concurrency scenarios such as a broadcast scenario, the ACM includes software lock, client separator, client rendezvous, and client observer functionality. An instrument ACM subsystem simplifies the problem from the client's perspective by moving the complexity to the lowest software layer, the RF (test) instrument.

20 Claims, 13 Drawing Sheets

(56) References Cited

U.S. PATENT DOCUMENTS

| | | |
|---|---|---|
| 9,946,727 B2 | 4/2018 | Bareket |
| 9,977,919 B2 | 5/2018 | Barrett-Bowen |
| 2005/0187957 A1 | 8/2005 | Kramer |
| 2006/0206626 A1 | 9/2006 | Sleeman |
| 2007/0094431 A1* | 4/2007 | Fachan .................. G06F 9/524 |
| | | 710/200 |
| 2008/0133736 A1* | 6/2008 | Wensley ................ G06Q 10/10 |
| | | 709/224 |
| 2016/0091876 A1 | 3/2016 | Keene |

* cited by examiner

AUTONOMOUS MANAGEMENT OF CONCURRENT SERVICING OF MULTIPLE CLIENTS BY AN INSTRUMENT

PRIORITY CLAIM

This application claims benefit of priority of U.S. Provisional Patent Application Ser. No. 62/080,183 titled "Autonomous Instrument Concurrency Management", filed on Nov. 14, 2014, which is hereby incorporated by reference as though fully and completely set forth herein.

FIELD OF THE INVENTION

The present invention relates to the field of instrumentation, and more particularly to the design of a system and method for autonomous instrument concurrency management.

DESCRIPTION OF THE RELATED ART

In many industrial applications (and others), instruments collect data or information from an environment or unit under test (UUT), and may also analyze and process acquired data. Some instruments provide test stimuli to a UUT. Examples of instruments include oscilloscopes, digital multimeters, pressure sensors, arbitrary waveform generators, digital waveform generators, etc. The information that may be collected by respective instruments includes information describing voltage, resistance, distance, velocity, pressure, oscillation frequency, humidity, and/or temperature, among others. Computer-based instrumentation systems typically include transducers for capturing a physical phenomenon and generating a representative electrical signal, signal conditioning logic to perform amplification on the electrical signal, isolation, and/or filtering, and analog-to-digital (A/D) conversion logic for receiving analog signals and providing corresponding digital signals to the host computer system.

In a computer-based system, the instrumentation hardware or device is typically an expansion board plugged into one of the I/O slots of the computer system. In another common instrumentation system configuration, the instrumentation hardware is coupled to the computer system via other means such as through a VXI (VME extensions for Instrumentation) bus, a GPIB (General Purpose Interface Bus), a PXI (PCI extensions for Instrumentation) bus, Ethernet, a serial port or bus, or parallel port of the computer system. The instrumentation hardware may include a DAQ (Data Acquisition) board, a computer-based instrument such as a multimeter, or another type of instrumentation device. In another common system configuration, a chassis and boards inserted in the chassis may operate as a standalone instrument or instrument suite, although in some cases a host computer may be used to configure or program the boards prior to, or during operation.

The instrumentation hardware may be configured and controlled by software executing on a host computer system coupled to the system, or by a controller card installed in the chassis. The software for configuring and controlling the instrumentation system typically includes driver software and the instrumentation application software, or the application. The driver software serves to interface the instrumentation hardware to the application and is typically supplied by the manufacturer of the instrumentation hardware or by a third party software vendor. The application is typically developed by the user of the instrumentation system and is tailored to the particular function that the user intends the instrumentation system to perform. The instrumentation hardware manufacturer or third party software vendor sometimes supplies application software for applications that are common, generic, or straightforward. Instrumentation driver software provides a high-level interface to the operations of the instrumentation device. The instrumentation driver software may operate to configure the instrumentation device for communication with the host system and to initialize hardware and software to a known state. The instrumentation driver software may also maintain a soft copy of the state of the instrument and initiated operations. Further, the instrumentation driver software communicates over the bus to move the device from state to state and to respond to device requests.

The production of many mobile devices requires relatively expensive radio frequency (RF) instruments for tuning and verification. Typically, the RF instrument utilization for a 1×1 arrangement or configuration in which one RF instrument is connected to one device under test (DUT) is less than 25% of the overall tuning and verification time. To reduce manufacturing costs, original equipment manufacturers (OEMs) of mobile devices have devised various methods to share their RF instruments—the high value asset—with more than one DUT. The sharing of instruments requires proper concurrency control to ensure that not only are the correct results for concurrent test operations generated, but the test results are obtained as efficiently as possible. Further improvements in concurrent instrument operations are therefore highly desirable.

Other corresponding issues related to the prior art will become apparent to one skilled in the art after comparing such prior art with the present invention as described herein.

SUMMARY OF THE INVENTION

Solving the instrument concurrency problem, at the most basic level, may include software locks designed to protect the resource—in this case the instrument—as it is shared by multiple device under test (DUT) test plans. In general, multiple threads simultaneously accessing a shared instrument may result in undesirable and unpredictable instrument behavior, which may ultimately lead to a system malfunction. Hence, software locks may be used to insure that only one DUT test plan accesses the shared resource at a time. A typical mobile device OEM software layout is divided into four logical layers as shown in FIG. 7. The four logical layers are the test plan layer (TPL) 702, hardware abstraction layer (HAL) 704, instrument specific HAL (ISHAL) 706, and physical instrument layer (PIL) 708. Normally, the concurrency capability, which is implanted as a software lock is built into the TPL or one of the HAL layers as symbolized by the keys 720 in FIG. 7. It should be noted that a software lock 720, sometimes called a mutex or semaphore, is used to control resource sharing by having the clients acquire the lock 720 before accessing the shared resource. There is one respective client running for each DUT, with the clients running in different threads or in parallel. The client using the shared resource is considered the active client. The active client returns the lock 720 when finished with the shared resource. If the lock 720 is in use by another client (i.e. the active client), any client or clients attempting to acquire the lock 720 (referred to as waiting clients) wait until the active client is finished and has returned the lock. This mechanism insures that only one client has direct access to the shared resource.

A novel approach includes building the concurrency capability directly into the instrument, as illustrated by instrument layer synchronization 710 in FIG. 7. Providing autonomous instrument-based concurrency allows for the OEM software code base (in TPL 702, HAL 704 and ISHAL 706) that does not have to be specifically implemented for concurrency, potentially saving thousands of lines of OEM software code. Autonomous concurrency management may be implemented based on the premise that "the instrument recognizes when it is busy". One example of a testing or measurement instruments is the National Instruments (NI) Mobile Communications Tester or MCT-120, which is used herein as an example of more generally referenced test instruments and/or measurement instruments. In other words, for ease of illustration the MCT-120 is intermittently used herein as an example for a test instrument, such as test (RF) instrument 730 shown in FIG. 7, for example. The MCT-120 is a typical SCPI (Standard Commands for Programmable Instruments) based RF instrument similar to other like instruments such as the Rhode and Schwartz CMW-500. Being a SCPI based instrument, the MCT-120 communicates with the OEM Industrial PC or PCs (IPCs) via a TCP/IP-Ethernet interface, forming a classic client-server system in which the MCT-120 operates as the server. As referenced herein, IPC is meant to denote a control PC or control system including one or multiple components, processing elements and/or equipment capable of controlling the DUT and/or the test instrument, and/or running test plans for testing the DUTs. Furthermore, processing element refers to various elements or combinations of elements. Processing elements include, for example, circuits such as an ASIC (Application Specific Integrated Circuit), portions or circuits of individual processor cores, entire processor cores, individual processors, programmable hardware devices such as a field programmable gate array (FPGA), and/or larger portions of systems that include multiple processors. As the server, the MCT-120 has multiple RF ports and is specifically designed to connect to and support multiple clients. It follows that each client (in classic client-server terms) represents one DUT test plan executing in its own thread, process, or even a process on its own IPC. More generally, the test instrument may have multiple RF ports specifically designed to connect to and support multiple clients, with each respective client representing one DUT test plan executing in its own thread, process, or a process on its own IPC.

In one set of embodiments, an autonomous concurrency management (ACM) subsystem may give the test instrument or equipment the capability to serve multiple uncoordinated and unaware clients, that is, clients unaware that they are sharing the test instrument. As such, the OEM software need not specifically support concurrency as stated above. This capability may then be included in the test/measurement instrument, such as Instrument C 730, which may also be equipped with an ACM subsystem. To be most efficient, the concurrency system (wherever it is in the overall system architecture) may also allow, when appropriate, DUTs to use the shared resource 720 at the same time. For example, the test instrument may broadcast a downlink signal, e.g. from a signal generator (SG) to a specified number (e.g. 4) of DUTs, allowing the specified number of DUTs to use the instrument in a true parallel fashion. This mode of parallel operation may be accomplished through a high degree of coordination between clients executing DUT test plans asynchronously. That is, in addition to the software lock 720, a software rendezvous (SWR) capability may also be implemented. The SWR may be configured to wait for the arrival of a specified number of threads, where the specified number may correspond to the specified number of DUTs (and therefore to a specified number of test plans) before proceeding—temporally making asynchronously executing DUT test plans synchronous, using the shared resource (e.g. measurement instrument) simultaneously. The test instrument ACM subsystem may handle the necessary client coordination (i.e. the SWR capability) for the downlink broadcast scenario. It should also be noted, as mentioned above, that the clients may be unaware they are sharing the instrument. Therefore, clients may be considered uncooperative or even hostile in the sense a client could, and perhaps should be expected to, send a command to, for example, turn off the test instrument SG while another client is actively using it.

To support basic concurrency scenarios where clients asynchronously share the instrument as well as advanced concurrency scenarios such as the broadcast scenario, various embodiments of an ACM subsystem within the instrument(s) may include the following capabilities:

Software Lock
  The SW lock may track which client (or clients in a broadcast scenario which will be further described below) is active. In this way, the ACM may keep inactive hostile clients from causing harm (as also explained above).
  The SW lock may implement a timer-based self-release mechanism for efficiency and to prevent deadlocks. As the client may be unaware, there may be no guarantee for an active client to signal that it has finished using the shared resource. Hence, a client could potentially connect to the test instrument SG and turn on the SG, without later turning the SG off to indicate that it no longer intends to use the SG. The self-release mechanism may simply release the SW lock by default, and further has the ability to optionally perform customizable actions as it releases the SW lock.
  To prevent a single client from holding a shared resource indefinitely, active clients may first release the SW lock before trying to acquire the SW lock, thereby affording waiting inactive clients the opportunity to acquire the SW lock and use the shared resource. However, the SW lock may be optionally configured to allow active clients to retain the SW lock under certain (previously) specified conditions.
  In some embodiments the SW lock may be implemented as a first-in-first-out (FIFO) acquisition with respect to waiting clients. That is, the inactive client among other inactive clients that has been waiting the longest may acquire the lock before the other waiting inactive clients.

Client Separator
  Over time, the number of clients may increase (and accumulate), creating maximum competition for the shared resource, e.g. for a shared measurement instrument. The ACM subsystem may keep the clients separated according to a specified, configurable time period or time period of specified duration, which may help reduce the competition for the shared resource or shared resources, making the system more efficient.

Client Rendezvous
  The ACM SWR makes asynchronous clients temporarily synchronous with respect to each other so they may actively use the shared resource at the same time. In this case, the SW lock may correspond to more than one active client.

Clients may indicate to the ACM the start of their respective test runs, enabling the ACM to identify with which clients it is to rendezvous. Because the clients are in general asynchronous, in some embodiments the ACM may only join clients starting within a (configurable) specified minimum time.

As clients connect to the test instrument (or instrument), there is no requirement or guarantee for each respective client to correspond to the same DUT type executing the same test plan. Therefore, in some embodiments, the ACM may be operated to join clients identified to be running compatible test plans, that is, test plans that have been identified to belong to a specified group of test plans. For example, in some embodiments, the ACM may join clients that have been identified to be running identical test plans.

Client Observer

As stated above, in some embodiments the ACM may join, for rendezvous, clients identified to be running test plans that all belong to a specified group of test plans (e.g. identical test plans). From the point of view of the instrument, that is, from the point of view of the ACM, the test sequence may be interpreted as a sequence of configuration states. For an SG, a configuration state may be represented by a frequency, power, and waveform (to be generated).

Clients running compatible test plans or the same test plans may have very repeatable and therefore predictable configuration state sequences. By observing and identifying these configuration states, the ACM, through its observer, may also be able to estimate the average time for each configuration state.

Therefore, the Client Observer may provide the ACM the needed context to recognize when to join clients.

The observed configuration state time may also be used by the ACM to set the SW lock self-release timeout, e.g. if configured to do so by a user.

Other aspects of the present invention will become apparent with reference to the drawings and detailed description of the drawings that follow.

BRIEF DESCRIPTION OF THE DRAWINGS

A better understanding of the present invention can be obtained when the following detailed description of the preferred embodiment is considered in conjunction with the following drawings, in which.

Figure 1:
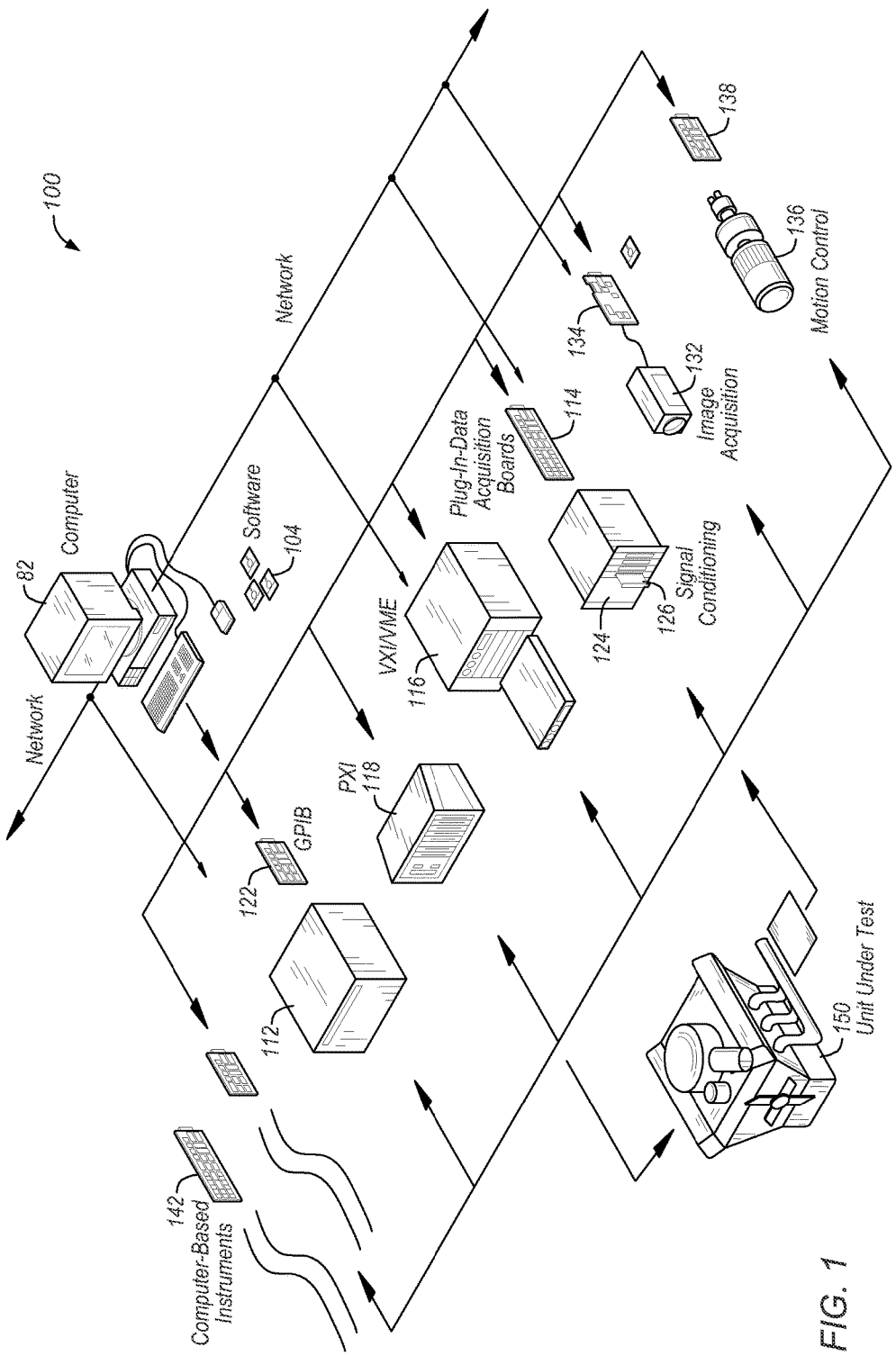
FIG. 1 shows an exemplary instrumentation control system with instruments networked together according to some embodiments.

While the invention is susceptible to various modifications and alternative forms, specific embodiments thereof are shown by way of example in the drawings and are herein described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE EMBODIMENTS

Embodiments of various instruments, including test instruments and/or test equipment may include an autonomous concurrency management (ACM) subsystem having observation and rendezvous capabilities allowing the instruments to be shared by devices under test (DUTs). The various embodiments of such ACM-equipped instruments described herein may be used in control systems configured to perform test and/or measurement functions on various devices. More specifically, the intelligent instruments may be used in various instances where expensive equipment/devices/instruments have to be shared, without requiring extensive and complex software overhead in the control system, allowing for autonomous concurrency management of multiple DUTs without an overly elaborate control algorithm. However, it is noted that various embodiments may equally be used for a variety of other applications, and such applications are not intended to be limited to those enumerated above. In other words, applications discussed in the present description are exemplary only, and various embodiments of test instruments and/or test equipment equipped with ACM having observation and rendezvous capabilities may be used in any of various types of systems where use and operation of such instruments and/or equipment may be desirable.

FIG. 1 illustrates an exemplary instrumentation control system 100 which may be configured according to embodiments of the present invention. System 100 comprises a host computer 82 which may couple to one or more instruments configured to perform a variety of functions using timing control implemented according to various embodiments of the present invention. Host computer 82 may comprise a CPU, a display screen, memory, and one or more input devices such as a mouse or keyboard as shown. Computer 82 may operate with one or more instruments to analyze, measure, or control a unit under test (UUT) or process 150. The one or more instruments may include a GPIB instrument 112 and associated GPIB interface card 122, a data acquisition board 114 inserted into or otherwise coupled with chassis 124 with associated signal conditioning circuitry 126, a VXI instrument 116, a PXI instrument 118, a video device or camera 132 and associated image acquisition (or machine vision) card 134, a motion control device 136 and associated motion control interface card 138, and/or one or more computer based instrument cards 142, among other types of devices.

The computer system may couple to and operate with one or more of these instruments. In some embodiments, the computer system may be coupled to one or more of these instruments via a network connection, such as an Ethernet connection, for example, which may facilitate running a high-level synchronization protocol between the computer system and the coupled instruments. The instruments may be coupled to the unit under test (UUT) or process 150, or may be coupled to receive field signals, typically generated by transducers. System 100 may be used in a data acquisition and control applications, in a test and measurement application, an image processing or machine vision application, a process control application, a man-machine interface application, a simulation application, or a hardware-in-the-loop validation application, among others.

Figure 2:
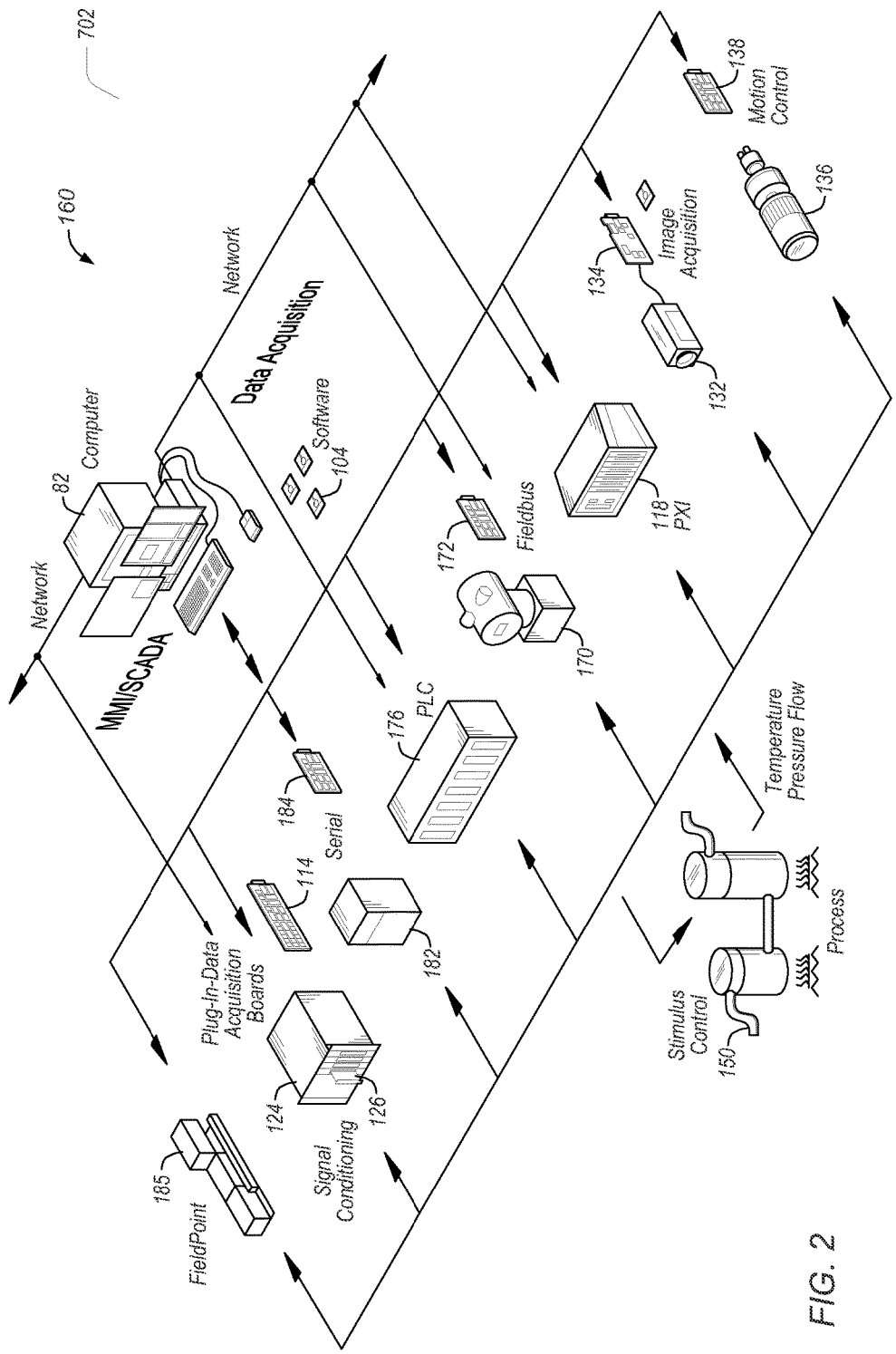
FIG. 2 shows an exemplary industrial automation system with instruments networked together according to some embodiments.

FIG. 2 illustrates an exemplary industrial automation system 160 that may be configured according to embodiments of the present invention. Industrial automation system 160 may be similar to instrumentation or test and measurement system 100 shown in FIG. 2. Elements that are similar or identical to elements in FIG. 1 have the same reference numerals for convenience. System 160 may comprise a computer 82 which may couple to one or more devices and/or instruments configured to perform a variety of functions using timing control implemented according to various embodiments of the present invention. Computer 82 may comprise a CPU, a display screen, memory, and one or more input devices such as a mouse or keyboard as shown. Computer 82 may operate with the one or more devices and/or instruments to perform an automation function, such as MMI (Man Machine Interface), SCADA (Supervisory Control and Data Acquisition), portable or distributed data acquisition, process control, and advanced analysis, among others, on process or device 150.

The one or more devices may include a data acquisition board 114 inserted into or otherwise coupled with chassis 124 with associated signal conditioning circuitry 126, a PXI instrument 118, a video device 132 and associated image acquisition card 134, a motion control device 136 and associated motion control interface card 138, a field bus device 170 and associated field bus interface card 172, a PLC (Programmable Logic Controller) 176, a serial instrument 182 and associated serial interface card 184, or a distributed data acquisition system, such as the Compact FieldPoint or CompactRIO systems available from National Instruments, among other types of devices. In some embodiments, similar to the system shown in FIG. 1, the computer system may couple to one or more of the instruments/devices via a network connection, such as an Ethernet connection.

Instrument Concurrency Problem

Historically, during the mobile device radio frequency (RF) tuning and verification process (an integral part of the manufacturing process) one RF instrument (signal analyzer and signal generator) has been connected to one device under test (DUT), e.g. to one mobile DUT. From the perspective of an original equipment manufacturer (OEM), one issue with the "one RF instrument to one DUT" approach is the high cost of RF instruments. Another issue relates to the utilization of the RF instruments. While the DUT is situated in the test fixture, active use of the RF instrument by the DUT is woefully low at about 20% to 30%. The issue may be compared to the "coffee shop with one bathroom" problem, whereby a coffee shop has only one bathroom (the shared resource). When patrons need to use the bathroom, they must first acquire the bathroom key. There is only one bathroom and therefore only one bathroom key. Any patron wishing to use the bathroom must wait until the bathroom key is available. If the bathroom is in use by another patron who has necessarily acquired the key, the bathroom is locked and the key is not available. When the patron using the bathroom is finished, he or she returns the bathroom key making it available for the waiting patron. This ensures that only one patron occupies the single shared bathroom at a time. Requiring patrons to acquire the key (the one and only key) before entering the bathroom solves the bathroom concurrency (i.e. sharing the bathroom between patrons) problem. Although subtle, this 'coffee shop with one bathroom' concurrency solution actually suggests both a software (i.e. the process of acquiring and returning the key) and hardware (i.e. the lock and the bathroom door) component. The "one RF instrument to one DUT" approach referenced above in this context may therefore be considered similar to a coffee shop owner installing a bathroom for every patron they can accommodate in the shop at any one time.

Typical Mobile Device RF Instrument Deployment Scenarios

Figure 3:
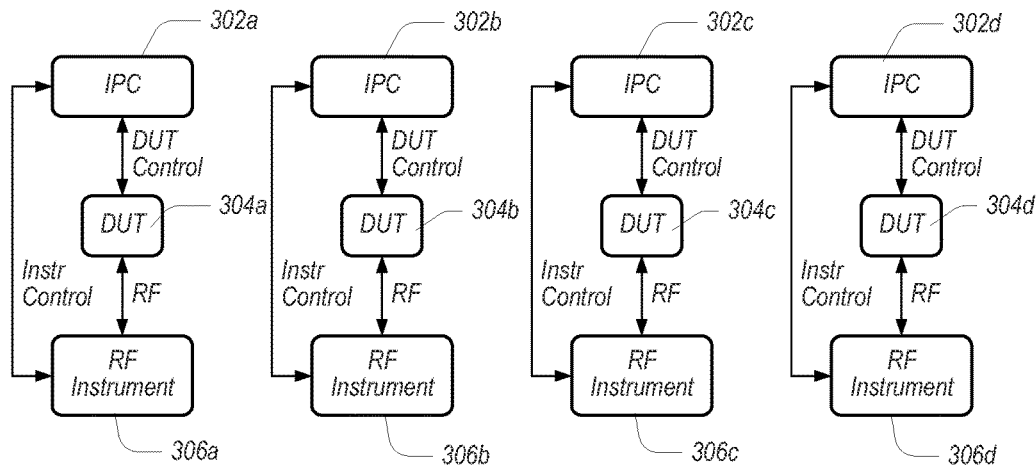
FIG. 3 shows an exemplary (1×1×1) original equipment manufacturer radio frequency (OEM RF) instrument configuration, according to some embodiments.

Unlike the simple coffee shop with one bathroom scenario, mobile device RF tuning and verification is very complex, usually requiring tens of thousands of lines of code for the software that automates the process (with over a billion mobile devices produced every year, automation is essential). To enable OEMs to share the RF instruments, this complex RF tuning and verification software must be extended for RF instrument concurrency, rendering an already difficult and complex process even more difficult and complex. Until recently, OEMs have avoided the RF instrument concurrency software problem by simply not sharing the RF Instrument. In doing so, the OEMs have also sidestepped the perhaps equally challenging RF switching and/or hardware combining required for RF instrument concurrency. Therefore, the typical OEM mobile device production setup is usually configured as one-by-one testers as shown in FIG. 3. Each individual DUT (304a, 304b, 304c and 304d, collectively referred to as DUTs 304) is controlled by a respective IPC (302a, 302b, 302c and 302d, collectively referred to as IPCs 302), with a respective test instrument (306a, 306b, 306c and 306d, collectively referred to as instruments 306) running tests for its corresponding DUT. Each respective IPC of IPCs 302 may also control its corresponding instrument of instruments 306 as shown in FIG. 3.

Figure 4:
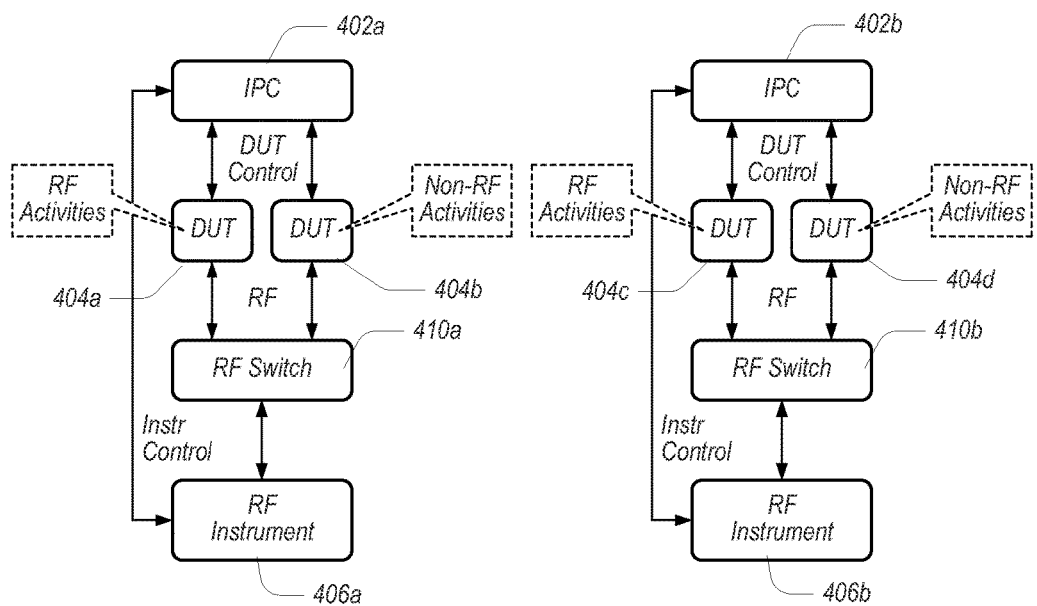
FIG. 4 shows an exemplary OEM RF instrument configuration connected in the separating mode (1×1×2), according to some embodiments.

At best, other solutions have a 'static separating configuration' as shown in FIG. 4, where one DUT connects to the RF Instrument (usually by a mechanical relatively slow RF switch) while the other DUT loads in the test fixture, boots, and does other non-RF related activities. The 'static separating configuration' is illustrated in FIG. 4, which shows two pairs of DUTs (404a/404b and 404c/404d), under respective control of IPC 402a and 402b, and respectively coupling to RF (test) instruments 406a and 406b via respective switches 401a and 410b. Considering DUTs 404a and 404b, for example, when switch 410a couples DUT 404a to instrument 406a, RF activities (e.g. testing) may be performed on DUT 404a while DUT 404b may be controlled by IPC 402a to perform non-RF activities, such as those mentioned above. On the other hand, when switch 410a couples DUT 404b to instrument 406a, RF activities (e.g. testing) may be performed on DUT 404b while DUT 404a is controlled by IPC 402a to perform non-RF activities. If a first time period during which the non-RF activities (including but not limited to loading, booting, etc.) take place is of a longer or equal duration than a second time period during which the RF testing is performed, the 'static separating configuration' is very efficient. However, the RF instrument utilization in the 'static separating configuration' is still quite low at about 50% if the RF instrument idle time during DUT control and other activities during the RF time is taken into account, especially if the first time period (non-RF activities) is shorter than the second time period (RF activities), which is often the case.

The (M×N×K) Notation

When describing OEM RF Instrument deployment scenarios, in order to more easily reference a given configuration, it is helpful to use the (M×N×K) notation, where:

M is the number of RF Instruments or SA/SG (Signal Analyzer/Signal Generator) channels, N is the number of DUTs dynamically sharing an RF Instrument (which is further discussed below), and K is the number of DUTs in the 'static separating configuration', or switched between RF and non-RF time (as described above).

Therefore, a (1×1×1) notation and a (1×1×2) notation in the respective descriptions for FIG. 3 and FIG. 4 have a precise meaning. The (1×1×1) notation refers to an RF Instrument with 1 channel (e.g. an SA and SG) connected to 1 DUT with no separation between RF/non-RF activities. The (1×1×2) notation specifies a single channel RF Instrument connected to two DUTs 'separated' in time between performing RF and non-RF activities (as described above with respect to FIG. 4).

Dynamic Instrument Sharing

To increase instrument utilization beyond what is possible in the 'static separating configuration', most large and small OEMs have begun to develop (or have already developed) the capability to dynamically share their RF instruments to exploit the RF instrument idle time during DUT control. For dynamic RF Instrument sharing (denoted by 'N' in the M×N×K notation), two or more DUTs may time division multiplex their access to the RF instrument, having the instrument quickly switch between DUTs. Therefore, DUTs access the RF instrument in a dynamic time interleaved way, taking full advantage of the RF instrument idle time resulting from DUT control. To dynamically share the RF instruments (the N in the M×N×K notation), solving the RF instrument concurrency problem may be considered essential. It should also be noted that as used throughout herein, the term DUT as an actor refers to the test plan controlling both the DUT and the RF instrument. Rather than referring to the test plan or the test sequence, it is simply more convenient to refer to the DUT instead. In other words, as used throughout herein, DUT may also refer to the test plan controlling both the DUT and the RF instrument when the DUT is referenced as an actor (in context).

Solving the RF Instrument Concurrency Problem

Figure 5:
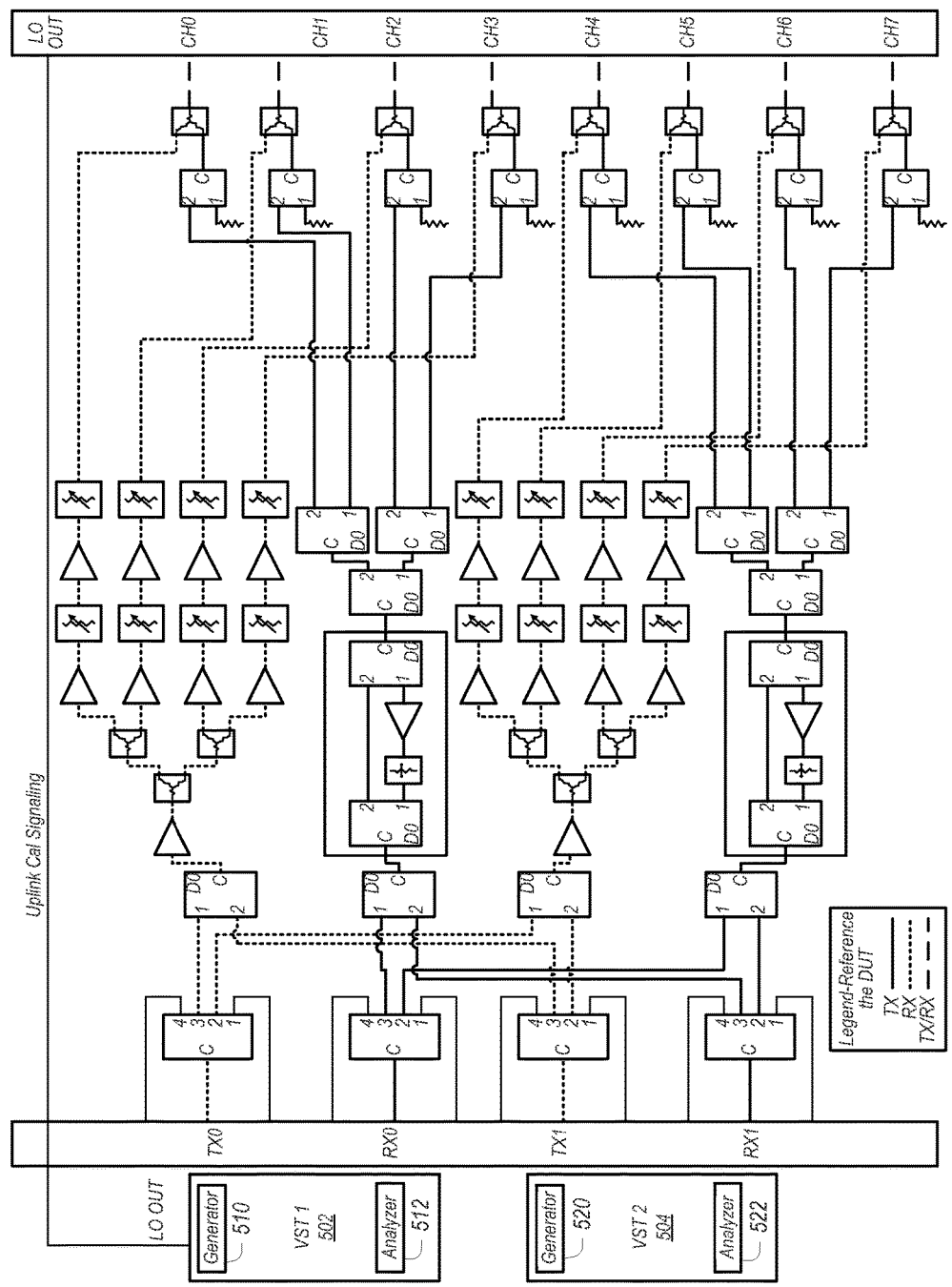
FIG. 5 shows a functional diagram of an exemplary tester instrument in which autonomous concurrency management (ACM) can be implemented.

Solving the RF instrument concurrency problem is very similar to solving the 'coffee shop/bathroom concurrency' problem. Various embodiments of a solution to the concurrency problem may include either a hardware (HW) component, a software (SW) component, or a combination thereof (i.e. both HW and SW component[s]). In considering the HW component, RF switching and/or combining may enable connecting multiple DUTs to one RF instrument. A suitable test instrument or test equipment may include/provide the necessary HW component[s]. One example of such a tester is National Instruments' MCT-120, a simplified logic diagram of which is shown in FIG. 5. The MCT-120 is shown by way of example for illustrative purposes, and other tester or testing instruments may equally provide the necessary HW structure for implementing improved resource sharing between DUTs. For example, the MCT-120 includes two VSTs (Vector Signal Transceivers) 502 and 504. VST 502 includes a respective signal analyzer (SA) 512 and a respective signal generator (SG) 510, and VST 504 includes a SA 522 and a respective SG 520. Therefore, referencing the M×N×K notation, N=2. The test instrument also includes multi-port, switch/combiner circuitry allowing for physical sharing of VST1 502 and VST 2 504 among multiple DUTs. For example, in the testing instrument shown in FIG. 5, the uplink from a DUT transmitter to the RF instrument (analyzers 512 and 522) is switched, with the receive path of the test instrument illustrated by solid lines. The downlink from a signal generator (generators 510 and 520) to a DUT receiver is broadcast to up to four DUTs through RF combiners, with the transmit path of the test instrument illustrated by dotted lines. The switching is solid state and therefore, almost real time. However, insuring instrument grade RF accuracy while limiting cost presents a considerable challenge, as the cost of the RF switching and combining elements/components is expected to be significantly less than the cost of the shared RF instruments (in this case the VSTs) themselves.

For the software component, the DUT (referring again to the note above regarding use of the term "DUT" when the DUT is an actor) is expected to first acquire the key before accessing the RF instrument. If the key is not available, the DUT may wait until the key becomes available. The key used for RF instrument concurrency may be implemented in software, e.g. using mutexes or semaphores. Mutex is an abbreviation for "mutual exclusion object", which is a program object that allows multiple program threads to share the same resource but not simultaneously. When a program is started, a mutex is created with a unique name, and, any thread that requires the resource locks the mutex from other threads while it is using the resource. The mutex is set to unlock when the resource is no longer needed or the thread has completed. This makes it possible for only one thread to access a code block (i.e. acquire the key, use the resource in the code block, return the key when finished). Semaphores provide signaling between threads, for example, thread A waits for a signal from thread B before taking over the resource.

Typical OEM RF Tuning and Verification Software Architecture

Figure 6:
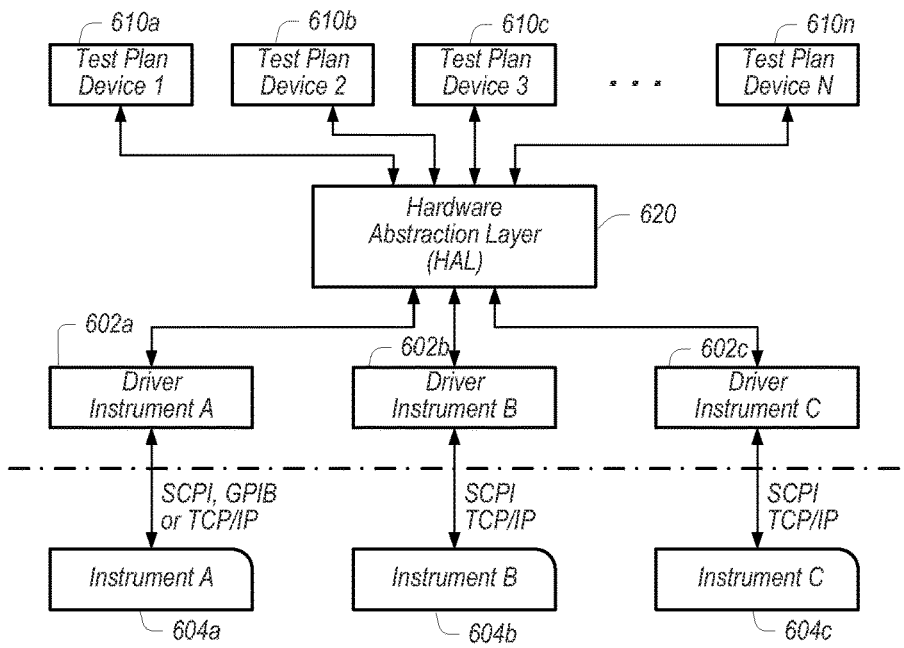
FIG. 6 shows an exemplary OEM software relational diagram, according to some embodiments.

Mobile device RF tuning and verification software may be quite complex. In order to reduce complexity, the software is usually implemented in layers as shown in the simplified software architecture diagram in FIG. 6. The diagram in FIG. 6 is simplified to show only the test plan and its relationship to the RF instrumentation components. As shown in FIG. 6, a number 'N' respective test plans 610a, 610b, 610c, . . . 610n (collectively referred to as test plans 610, which may be used for 'N' devices, or DUTs, for example), interact with the hardware abstraction layer (HAL) SW 620, which in turn interacts with respective instrument driver SW 602a, 602b, and 602c (collectively referred to as drivers 602), respectively controlling instruments 604a, 604b, and 604c (collectively referred to as instruments 604). The drivers 602 may control their respective instrument 604 via a number of different interfaces, for example over a Standard Commands for Programmable Instruments (SCPI) interface, IEEE-488 standard interface (GPIB), or Transmission Control Protocol/Internet Protocol (TCP/IP) among others. The various interfaces are shown as examples of possible interfaces and suitable interfaces that are used or may be used are not limited to those shown. In general, the test plans 610 control the test flow and the retrieval of data (e.g. which test to run, the parameters used for the tests that are running, pass/fail limits, etc.) from the OEM's production control system, as well as the return of the test results to the OEM's production control system. Accordingly, a test plan (such as any of test plans 610) may control both the DUT (corresponding to the test plan) and the RF instrument (such as any of instruments 604). All RF instrument commands may go through the HAL 620, which provides a common interface between the test plans 610 and the instruments 604, enabling the OEM to use more than one instrument while keeping the test plan the same. Finally, under the HAL 620, each instrument of instruments 604 has its own implementation both in the driver SW 602 and on the physical instrument 604. It should also be noted that large and medium OEMs are motivated to use multiple instruments, even with the HAL complexity cost, to maximize RF instrument vendor competition. This may reduce cost, and perhaps more importantly, the continuous and direct competition improves RF instrument service and support. Finally, supporting multiple RF instruments reduces the risk that may be associated with supporting only one RF instrument.

RF Instrument Concurrency Approaches

Figure 7:
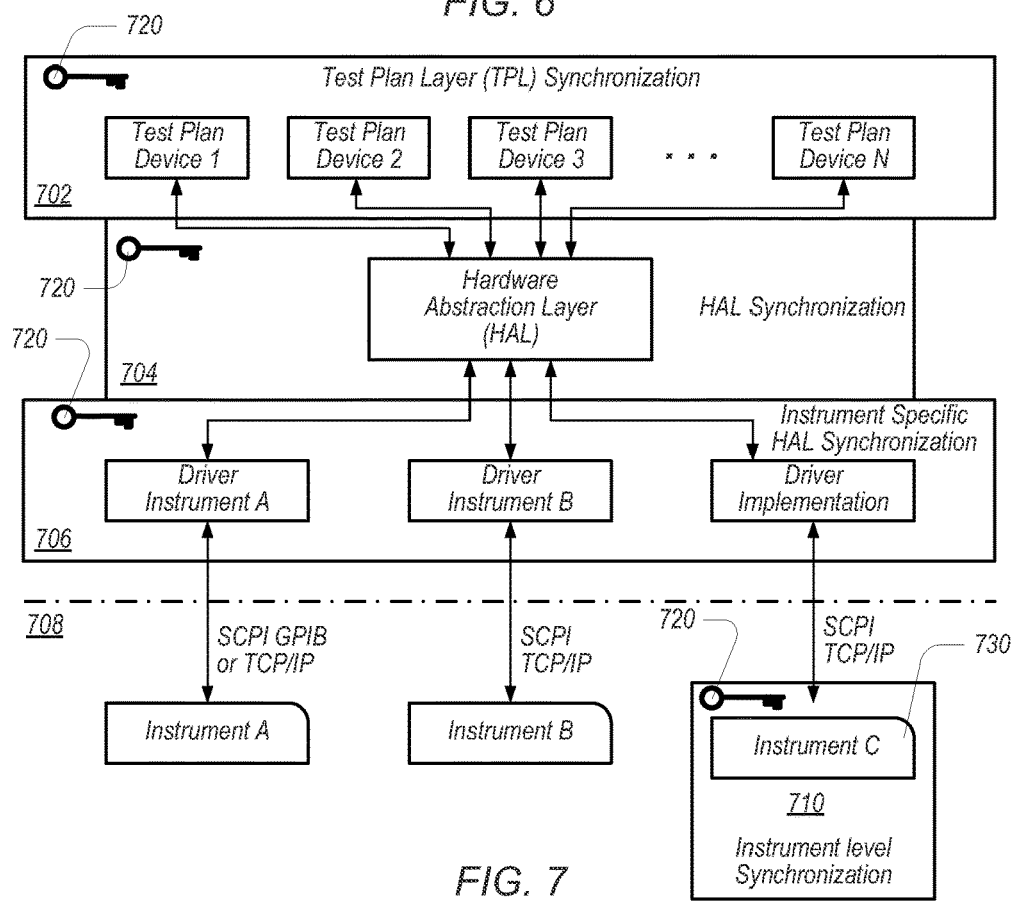
FIG. 7 shows a diagram illustrating an exemplary RF instrument concurrency scheme, according to some embodiments.

Most OEM tuning and verification software architectures (such as the one shown in FIG. 6, for example) have been implemented without considering RF instrument concurrency. That is, they have been implemented for the (1×1×1) or (1×1×2) arrangements. One issue related to RF instrument concurrency is which software layer should implement the concurrency code, i.e. the code implementing the key for locking and unlocking the RF instrument. As previously discussed, FIG. 7 illustrates four different approaches to implementing the SW key:

Implementing the SW key for test plan level synchronization
    Implementing the SW key for HAL level synchronization
    Implementing the SW key for instrument-specific HAL level synchronization
    Implementing the SW key for instrument level synchronization.

Test Plan Level Synchronization

Figure 8:
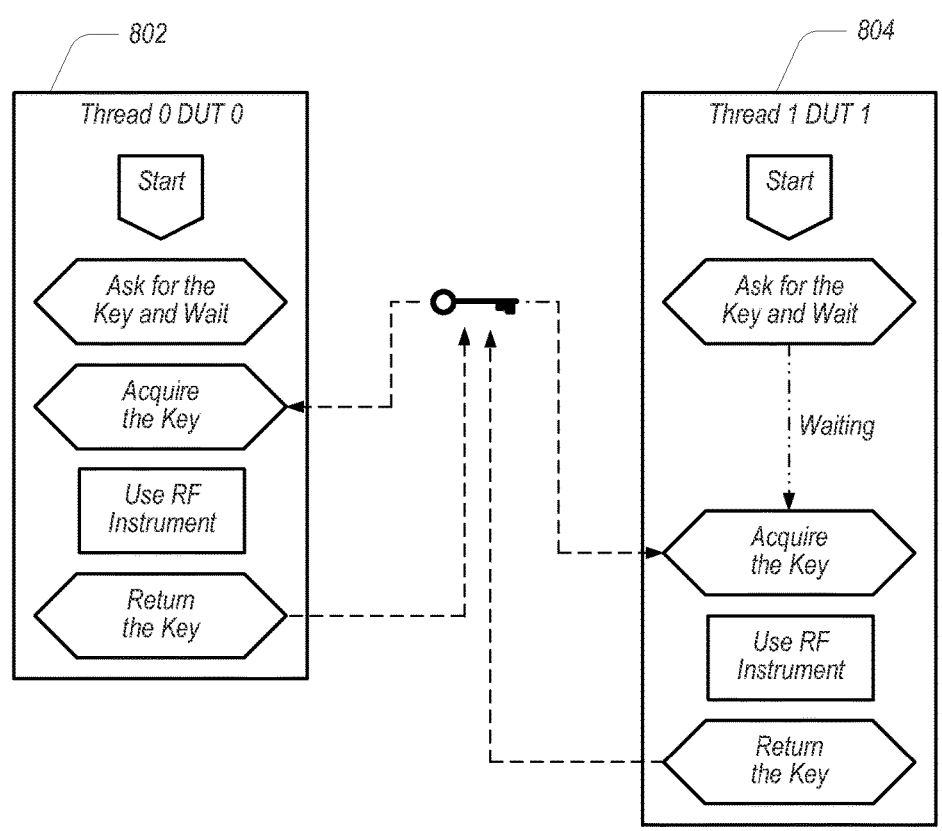
FIG. 8 shows a diagram illustrating an exemplary test plan level synchronization according to some embodiments.

Of the four approaches, synchronization in the test plan is the most common and appears to present the best alternative, considering that it is implemented in the test plan that controls the test flow. FIG. 8 shows the test flow for two DUTs with RF instrument concurrency, i.e. the two DUTs sharing the instrument. The DUT control is not shown for the sake of simplicity. As shown in FIG. 8, the test flow for the two DUTs is implemented in the same process (or executable programming instructions), with the process (or executable instructions) running in parallel as two separate threads 802 and 804. The instrument concurrency mechanism, that is, the process of acquiring the key and returning the key when finished, may be considered similar in nature to the 'coffee shop and one bathroom' concurrency solution. For example, as illustrated in FIG. 8, thread 802 and thread 804 may each request the key and wait for the key to become available. If thread 802 acquires the key, thread 804 continues to wait while thread 802 uses the key (while using the instrument). Once thread 802 is done using the instrument, it releases the key, which is then acquired by thread 804 for thread 804 to start using the instrument.

Concurrency Code in Every Test Case

However, even in its simplicity, problems may arise when using this approach. For example, OEMs develop and maintain several test plans (see for example FIG. 6 and FIG. 7) for all the mobile devices they produce—each of which could have hundreds of test cases. The 'Ask for the Key and Wait', 'Acquire the Key', and 'Return the Key' steps shown in FIG. 8 are added to every test case in all test plans. Assuming the test plans were originally devised without taking into account RF instrument concurrency, a great portion of the code may have to be retrofitted, also necessitating the creation of regression tests.

All DUT Test Plan Executions are in the Same Process on the Same Computer

Another problem with this mechanism is that the key and test plan threads for each DUT are part of the same process running on the same computer unless a form of inter-process/inter-computer synchronization scheme is employed. Such schemes, however, may result in the system becoming more complicated and potentially less reliable. Therefore, test plan synchronization, for all practical purposes, requires those test plans to execute in the same process on the same computer, which limits flexibility.

Test Plans and Test Designers are RF Concurrency Aware

Implementing the synchronization code directly in the test plan causes the test plan to be aware of its sharing the RF instrument. As a consequence, test plan designers have to be aware of the RF instrument concurrency and implement test cases accordingly, which may increase the potential for unintended errors. In other words, when the synchronization is implemented in the test plan, the test designer is burdened with accommodating the RF instrument concurrency.

Efficiency when Multiple RF Instruments are Supported

Figure 9:
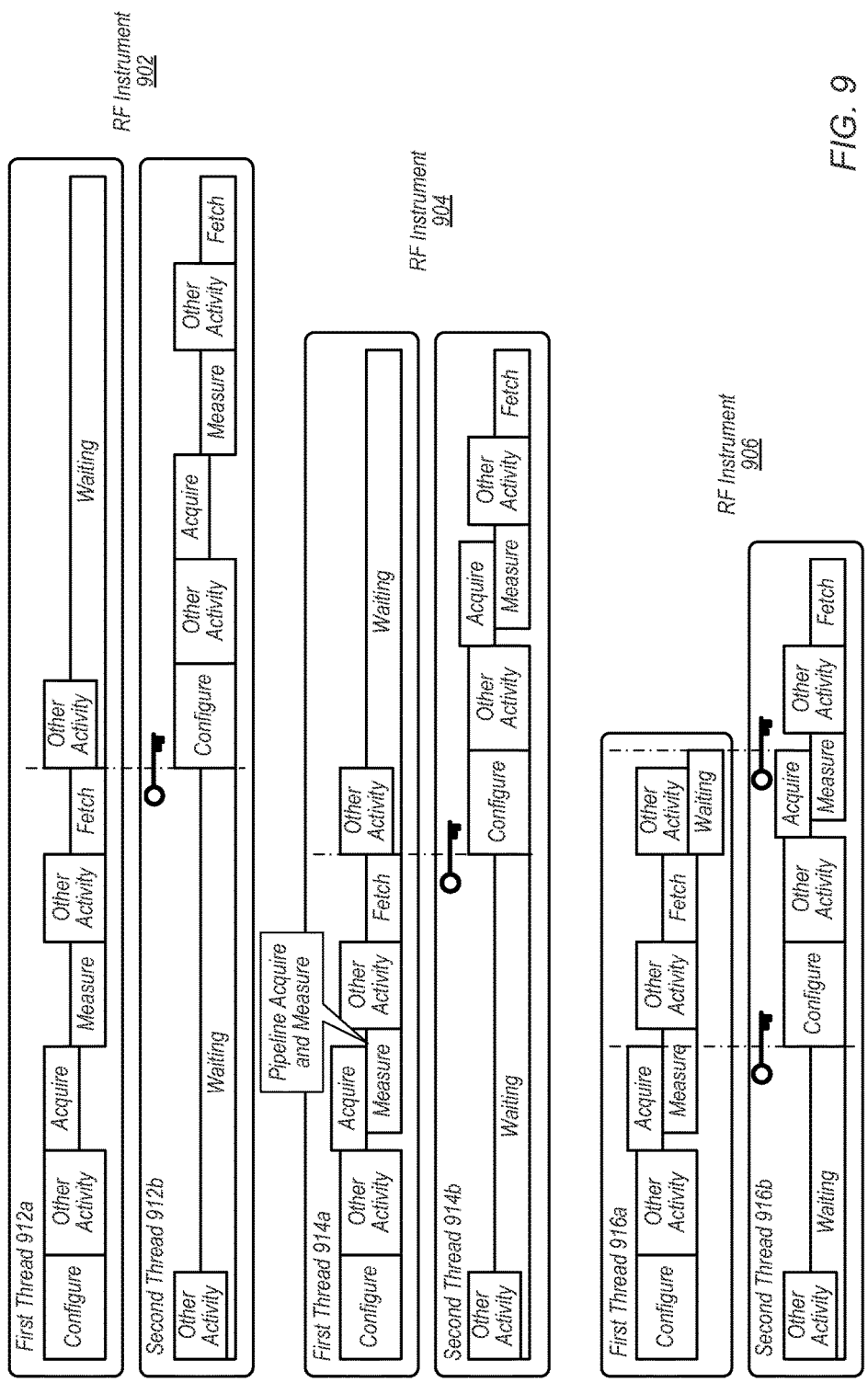
FIG. 9 shows a diagram illustrating unequal RF instrument concurrency scenarios, according to some embodiments.

Another issue with test plan synchronization is efficiency when the HAL supports multiple RF instruments. For uplink measurements, most RF instruments are configured for a given measurement and cannot be reconfigured for subsequent measurements until those measurements are fetched from the instrument, as illustrated for RF instruments 902 and 904 in FIG. 9. For example, as shown in FIG. 9 with respect to RF instrument 902, reconfiguration for second thread 912b may not take place until the data corresponding to the measurements acquired as a result of running first thread 912a has been fetched. Once the fetch takes place, the key may be released to second thread 912b. Similarly, with respect to RF instrument 904, reconfiguration for second thread 914b may not take place until the data corresponding to the measurements acquired as a result of running first thread 914a has been fetched. Once the fetch takes place, the key may be released to second thread 914b. RF instrument 904, in the example shown, differs from RF instrument 902 in implementing pipelined acquisition and measurement steps, but configuration for second thread 914b can still not take place until the data for first thread 914a has been fetched. In addition, as shown in FIG. 9, RF instrument 906 is potentially more efficient than RF instruments 902 and 904 (which will be further addressed below), as second thread 916b may be configured at the end of the measurement acquisition ("Acquire") phase during first thread 916a. However, if a HAL and/or a common RF instrument interface is implemented, all RF instruments, regardless of which RF instrument is used, may stay locked until the fetch is complete. With test plan level synchronization, in order to realize improved efficiency, test plans have to be specifically implemented for the test instrument, thereby greatly limiting the HAL advantages.

Test Plan Level Concurrency is Cooperative

However, test plan level concurrency does provide at least one advantage. The test plan is cooperative because it is RF instrument concurrency aware (as previously explained above). Accordingly, test designers may insure the DUT 1 test plan (corresponding to the second threads in FIG. 9) does not, for example, turn off the SG (e.g. in a post-test action) while DUT 0 (corresponding to the first threads in FIG. 9) is actively using the same SG. At worst, what may happen in such cases is that the SG is turned off, causing DUT 0 (i.e. the first thread) to fail. If DUT 1 (i.e. the second thread) has to acquire the lock before calling a corresponding command to turn off the SG, efficiency may be severally impacted because DUT 1 is needlessly blocked for an action it is not intended to do, specifically, turning off the SG if it is not actively using the SG.

HAL Level Synchronization

HAL level synchronization has advantages over test plan level synchronization because it involves must less code. That is, there are likely far fewer HAL methods or operations (at least in a well-designed HAL) as individual test cases. Essentially, the synchronization code—'Ask for the Key and Wait', 'Acquire the Key', and 'Return the Key' (again referencing FIG. 8)—is moved from the test plan layer (level) to the HAL. If an existing test system is retrofitted, the test plan (implemented as a 1×1×1 system) is not aware that the RF instrument is being shared, and is therefore considered non-cooperative. Because the test plan is non-cooperative, the HAL synchronization has to be implemented to account for situations where a non-cooperative test plan may either cause a failure or may greatly reduce efficiency. HAL synchronization is also beset by the same efficiency issues described above in the section "Efficiency when multiple RF instruments are supported".

Instrument Specific Driver Synchronization

Instrument specific driver synchronization (indicated as instrument specific HAL synchronization 706 in FIG. 7) is very similar to HAL level synchronization and is potentially more efficient for some instruments because the synchronization may be tailored for each supported instrument. For example, referring again to FIG. 9, RF instrument 906 may be unlocked (i.e. the key may be returned) immediately after acquisition (indicated as the "Acquire" step in FIG. 9) while instruments 902 and 904 retain the lock until all results are fetched. The disadvantage over HAL synchronization is that more code needs to be retrofitted as each of the supported instrument specific drivers need to be retrofitted.

Instrument Level Synchronization

Synchronization in the instrument is a novel approach based on the premise that the instrument is aware when it is in use (or busy). This may be fairly straightforward for uplink measurements (e.g. for the DUT transmitting to the RF instrument SA). The 'Ask for the Key and Wait', 'Acquire the Key', and 'Return the Key' steps (referring to FIG. 8) may be easily performed within the RF instrument without the client (the test plan, HAL, and instrument specific driver) being aware of the fact that the RF instrument (acting as the server) is operating as a shared resource. However, being totally unaware, the client is considered non-cooperative. Therefore, in the configure step (referring again to FIG. 9), the client may wait until the SA is available, which, in this case is an indication that the RF instrument is a shared resource. SA synchronization or concurrency is autonomous using only internal information locking itself on configure and unlocking when acquisition is complete (if capable) or after the fetch is complete (see again FIG. 9).

The downlink (i.e. the RF instrument SG transmitting to DUT receiver) concurrency is more difficult, because only the DUT is aware of when it is finished with the SG, i.e. with the shared resource. Oftentimes, test plans (especially test plans implemented for one RF instrument and one DUT or 1×1) do not turn off the SG (which would signal that the DUT no longer needs to use the SG) and only reconfigure the SG state (frequency, power, waveform, etc.) during the test sequence, as the test plan is unaware and non-cooperative. There is therefore no guarantee that the DUT ever turns off the SG (shared resource) even when the DUT is finished using the shared resource and may even physically be removed from the test fixture.

Therefore, if the SG (downlink) concurrency is to be autonomous similar to the SA (uplink) concurrency, the instrument may use context clues and in some cases information from the instrument specific driver on the client. The system enabling autonomous concurrency may rise to a full-fledged RF instrument subsystem on par with, e.g., the SA and SG subsystems. This subsystem (novel for RF instruments) is referred to herein as the Autonomous Concurrency Management (ACM).

Autonomous Concurrency Management (ACM)

Figure 10:
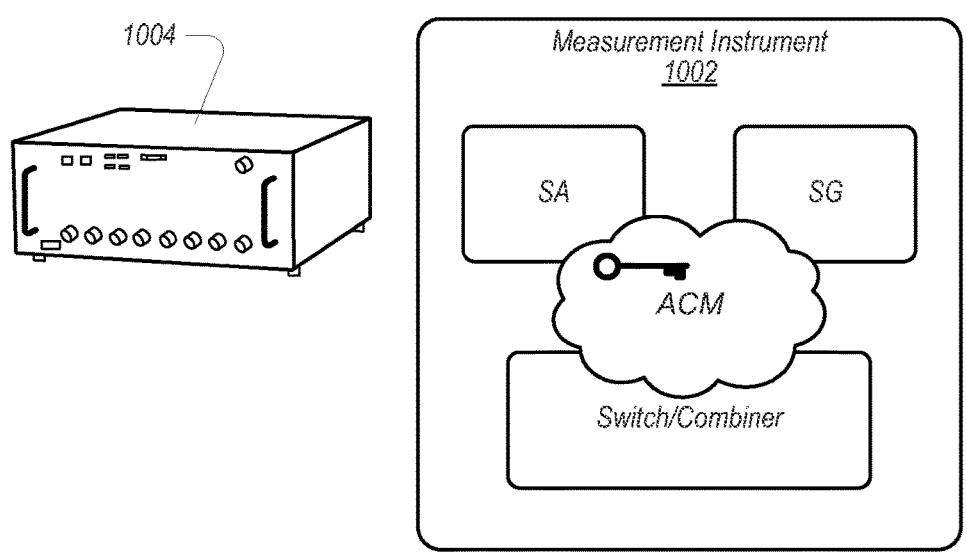
FIG. 10 shows a block diagram of an exemplary measurement instrument implementing an ACM subsystem, according to some embodiments.

FIG. 10 shows a simplified block diagram representation of an exemplary measurement instrument 1002 that includes an ACM subsystem for efficient and versatile sharing of instrument 1002 by multiple DUTs. Instrument 1002 may be part of a testing system, for example a testing instrument 1004 shown in FIG. 10. The ACM subsystem may enable the RF instrument (referenced as the server) to reliably and efficiently handle a variety of multi-DUT scenarios seamlessly with minimal cooperation from the client software (test plans, HAL's, etc.).

Figure 11:
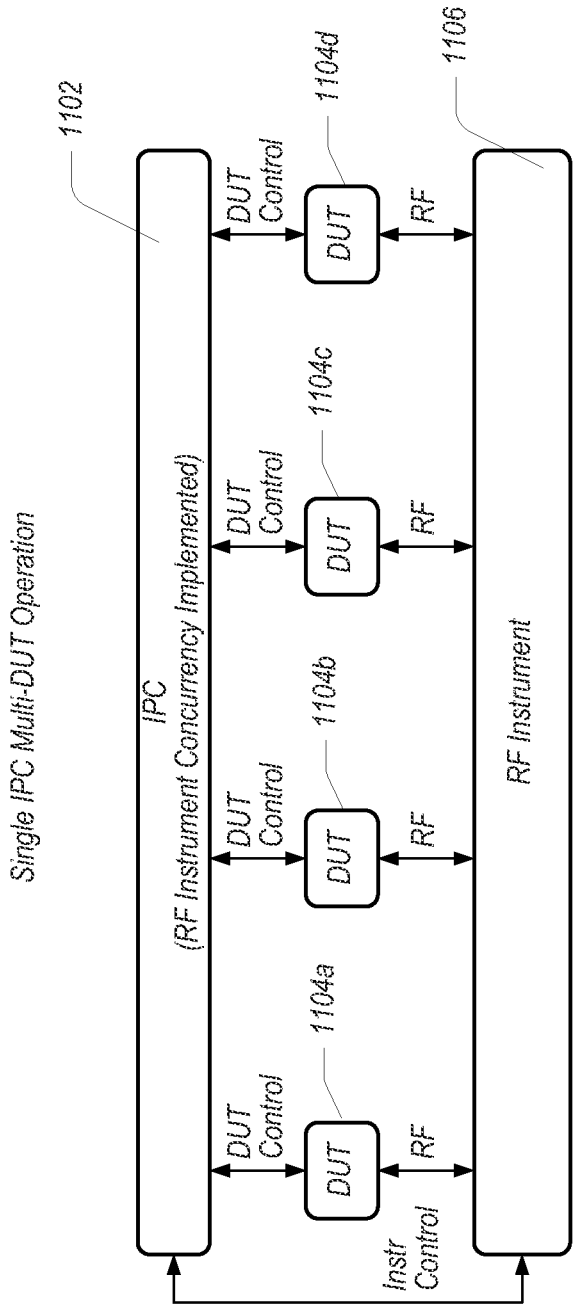
FIG. 11 shows a diagram illustrating an exemplary transformation (transition) to dynamic RF instrument sharing, according to some embodiments.

Without an ACM subsystem in the RF instrument, the RF instrument concurrency may be implemented in the software as previously described above. To do so, the software may be extended to be multi-threaded so it runs test sequences in parallel and may have the appropriate concurrency software to protect the shared RF instrument. In addition, testers running a single test fixture with one IPC (as previously shown in FIG. 3, for example) may be changed such that a single IPC controls multiple test fixtures and multiple DUTs as shown in FIG. 11. FIG. 11 shows a diagram of an exemplary system in which a single IPC 1102 controls multiple DUTs 1104a, 1104b, 1104c, and 1104d (collectively referred to as DUTs 1104) sharing a single RF instrument 1106. If the RF instrument 1106 is equipped with an ACM subsystem, dynamic RF instrument sharing becomes straightforward, requiring almost no changes on the production floor. The transformation to the multi-DUT operation shown in FIG. 11 is therefore representative of a typical transformation to dynamic RF instrument sharing.

Figure 12:
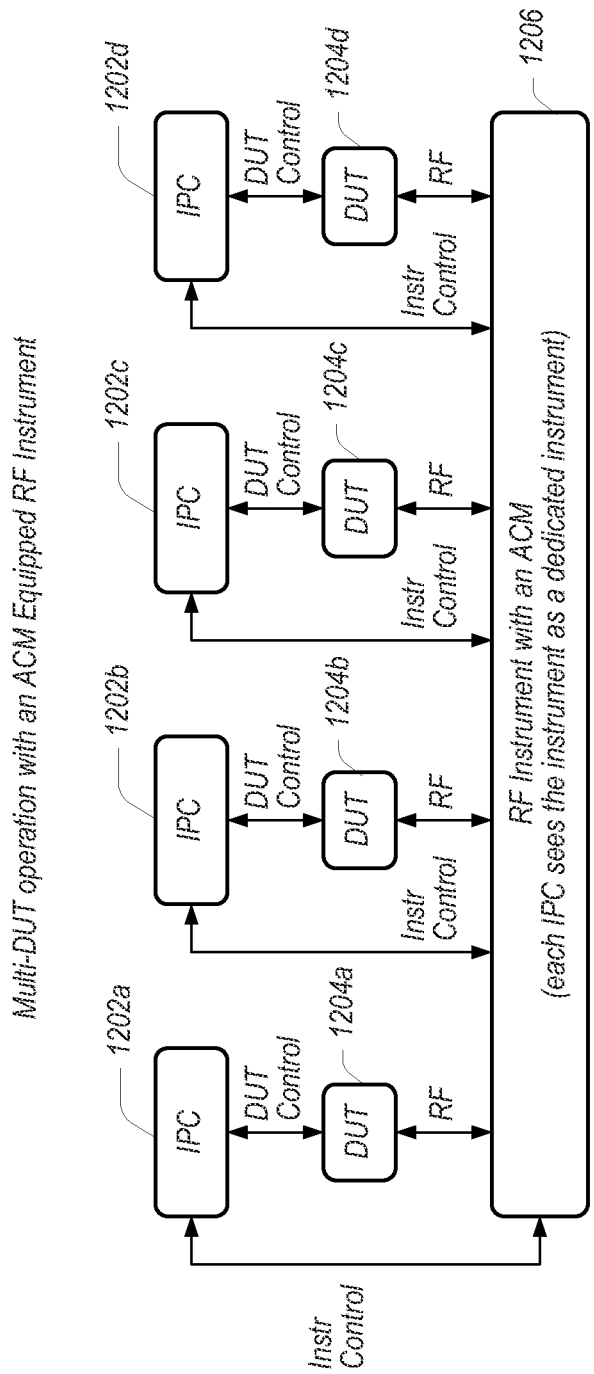
FIG. 12 shows a diagram illustrating an exemplary transformation (transition) to RF instrument sharing with an ACM-equipped RF instrument, according to some embodiments.

In contrast, FIG. 12 is representative of a novel transformation to dynamic RF instrument sharing, in which the RF instrument is equipped with an ACM subsystem. As shown in FIG. 12, in one set of embodiments, the single ACM-equipped RF instrument 1206 may expose a virtual instrument to IPC 1202a, IPC 1202b, IPC 1202c and IPC 1202d (collectively referred to as IPCs 1202 or IPC 1202). In other words, the single ACM-equipped RF instrument 1206 may expose a virtual instrument to each IPC. Hence, each IPC 1202 may detect the ACM-equipped RF instrument 1206 as an instrument dedicated to the IPC just as if it were in a one-by-one configuration. Following the (M×N×K) notation, the systems in both FIG. 11 and FIG. 12 represent (1×4×1) configurations. In the case of FIG. 12, if the RF instrument (or test instrument) includes two VSTs, the (M×N×K) configuration is (2×2×1). The product is still 4 (2×2×1=4) as in the case of a (1×4×1) configuration. If the separating scheme were used (as previously shown in FIG. 2) with an RF instrument that includes two VSTs, the (M×N×K) configuration would be (2×2×2) or 8 DUTs sharing a single RF instrument, such as the instrument illustrated in FIG. 5, for example.

ACM Capabilities

To be reliable, efficient, and autonomous, the ACM may include the basic 'Ask for the Key and Wait', 'Acquire the Key', and 'Return the Key' capability, and in addition may be aware of which DUT(s) are actively using the resource. In addition, since the DUT is non-cooperative, the ACM may also be aware of the time (or time period or time duration) for which a specific resource is in use, which enables the ACM to proactively release the resource even though the client (e.g. IPC controlling the DUT) has not yet signaled the release (as previously mentioned, there may be no guarantee that the client ever signals such release).

Rendezvous

In case the RF instrument is downlink broadcast capable, it may permit DUTs to use the SG within the RF instrument in a true parallel fashion. With non-cooperating asynchronous DUTs, the ACM may synchronize those DUTs on the fly. Accordingly, the ACM may use more than a simple lock to protect the shared resource, and may possess the capability to wait for multiple DUTs so they can synchronously use the shared resource (in this case the SG) while protecting that resource from other asynchronous clients. In other words, the ACM may have rendezvous points, and may determine which DUTs to rendezvous, all with minimal information from the DUTs. Such DUTs may be referred to as joined DUTs. It should also be noted that a rendezvous is fundamentally different than a lock or a semaphore.

A semaphore is set to allow a configurable number of threads to proceed. For example, a semaphore set to 3 allows the first three threads to pass unobstructed while blocking all other threads after the first three threads have passed. The semaphore blocks until its internal count is equal to the set thread count (in this example, 3). When a thread has completed its action it releases the semaphore, thereby reducing the count by one, at which time the semaphore allows another thread to proceed. It follows that a lock is really just a special case of a semaphore, which is configured to allow only one thread to proceed. It should also be noted that mutexes and semaphores, although having similar behaviors, may be implemented differently. In contrast, a rendezvous may block all threads until a configurable number of threads arrive, then allow those joined or synchronized threads to pass unobstructed. Thread synchronization facilitates the DUTs' effective use of a shared resource at the same time or in parallel.

Observer

To be most effective, the ACM may include an observer, or an observer function to record and track the instrument configuration states which are repeatable on a DUT-by-DUT basis. Each DUT may run a test plan (usually, but not necessarily, the same test plan) that requests a repeatable configuration state sequence for all passing DUTs, which may represent a vast majority of the DUTs, e.g. over a specified number of DUTs of all DUTs, that is, over a specified percentage (e.g. 95%) of the DUTs. The ACM may use the observer data (both the configuration state sequence and the time in each state) to make informed decisions for locking timeouts, and if it possible, run two or more DUTs synchronously (i.e. join those DUTs) so as to use a shared resource in parallel.

Multiple DUTs Running Asynchronously

As previously noted, FIG. 12 shows both the SA and SG dynamically running asynchronously. In this scenario, four client test executives (1202) in separate executables (application spaces) are able to successfully and dynamically share the RF instrument's SA and SG (or simply, share the RF instrument or test instrument) all with minimal support from the client test executives. The client test executives contain no concurrency code. The only concurrency requirement on the client test executives is the ability to wait until the shared resources become available. If the client uses the RF instrument's SCPI interface, for example, the client test executives may implement an '*OPC?' (SCPI Operation Complete) after initiate commands (which may be implemented in the RF instrument as asynchronous commands) and then poll (or wait for) the '*OPC?' until it returns complete, signaling that the shared resource is available. More generally, the client executive may use feedback signaling implemented in the interface protocol used by the client (DUT) and the RF instrument to communicate with each other, to detect when the shared resource becomes available.

Figure 13:
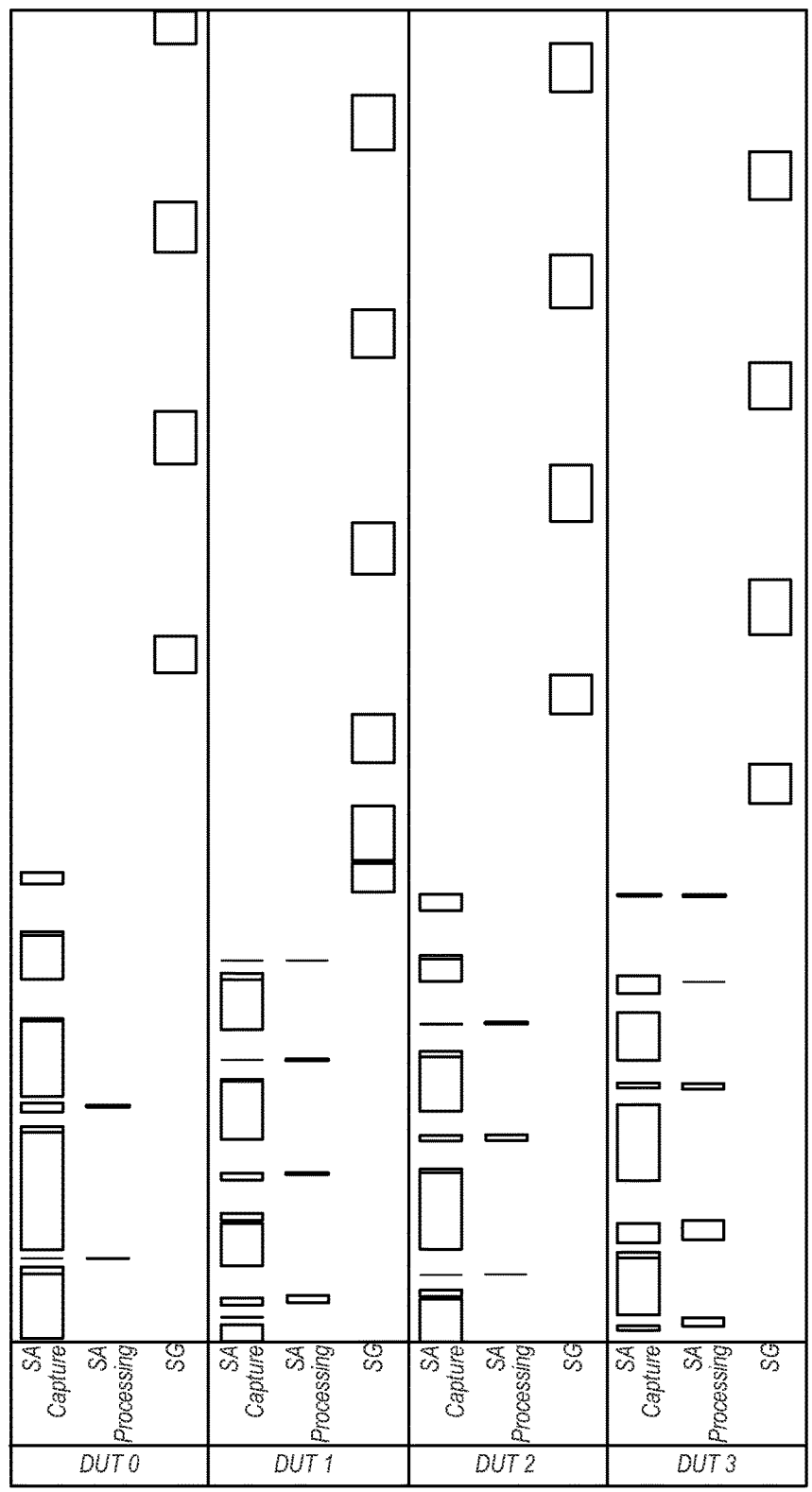
FIG. 13 shows a timeline diagram illustrating operation of an exemplary ACM-equipped measurement instrument autonomously operating for multiple devices under test (DUTs) asynchronously, according to some embodiments.
Figure 14:
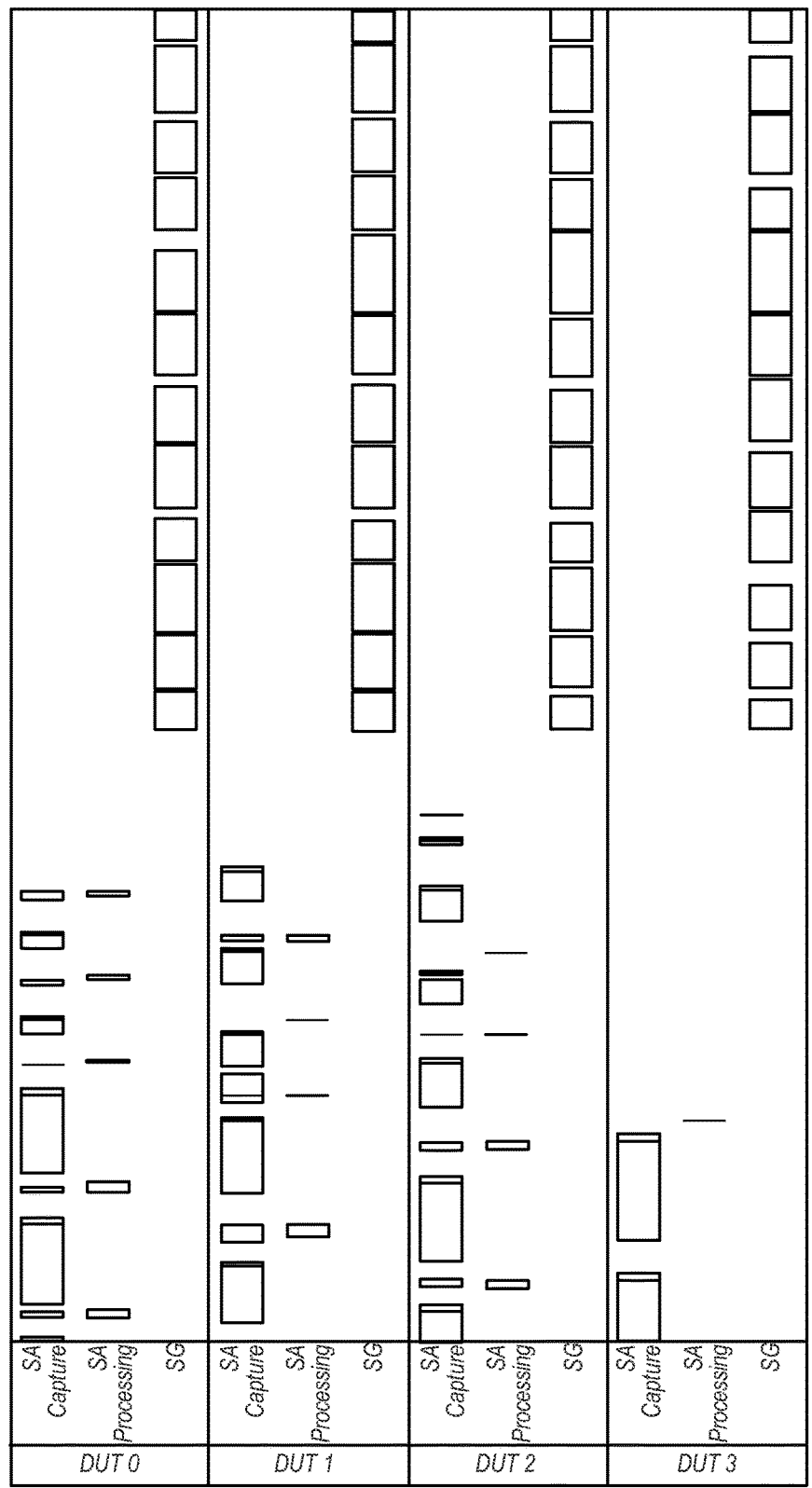
FIG. 14 shows a timeline diagram illustrating operation of an exemplary ACM-equipped measurement instrument autonomously operating for multiple DUTs, asynchronously for a signal analyzer and synchronously for a signal generator, according to some embodiments.
Figure 15:
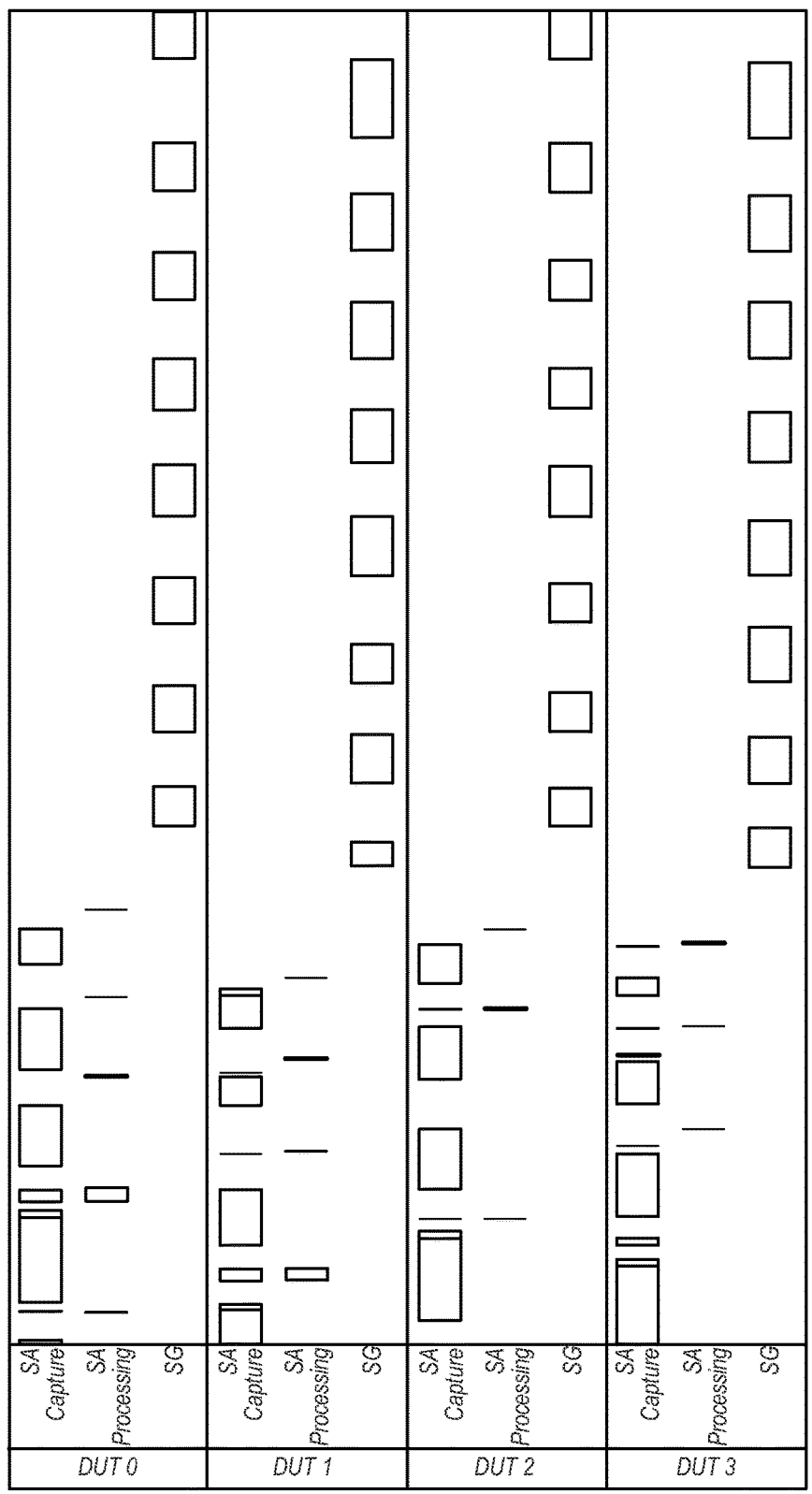
FIG. 15 shows a timeline diagram illustrating operation of an exemplary measurement instrument autonomously operating four DUTs, asynchronously for a signal analyzer and signal generator, synchronously for two each of two respective pairs of DUTs.

After the signal generator advance ACM observes the same configuration state sequences for two consecutive test runs, the advance ACM may enable the DUTs to use the SG in a true parallel fashion. Again this behavior is autonomous requiring no client side changes for operating as shown in FIG. 13 and FIG. 14. FIG. 13 illustrates the operation of an ACM-equipped RF instrument or test instrument autonomously running four DUTs asynchronously, while FIG. 14 illustrates the operation of an ACM-equipped RF instrument or test instrument autonomously running four DUTs synchronously for the SA function (uplink) and asynchronously for the SG function (downlink). The diagrams provide an illustration of the SA and SG functionality performed over a specified timeline for each of the four DUTs. As seen, the test time may be reduced by almost 50%. It should be noted that the white spaces in these figures are a plotting artifacts. As another example, FIG. 15 shows the system running with DUT0 (client 0) and DUT2 joined and DUT1 and DUT3 joined (which two DUTs are joined is arbitrary). In the illustrated case, the property of a maximum number of DUTs that are allowed to join is set to 2, and no changes on the client side are required to join 2, 3 or 4 clients.

Solving the RF instrument Concurrency problem with an instrument ACM subsystem simplifies the problem from the client's perspective by moving the complexity to the lowest software layer—the RF instrument. Various specific examples provided herein have been for a multi-port RF instrument, or test equipment, but the ACM subsystem and principles associated therewith as disclosed herein are equally applicable to all instrument types used for the purposes as disclosed herein.

Although the embodiments above have been described in considerable detail, numerous variations and modifications will become apparent to those skilled in the art once the above disclosure is fully appreciated. It is intended that the following claims be interpreted to embrace all such variations and modifications.

I claim:

1. A non-volatile memory device storing autonomous concurrency management (ACM) programming instructions executable to cause an instrument to concurrently serve at least two clients, wherein to cause the instrument to concurrently serve the at least two clients, the programming instructions are executable to:
   implement a software lock function that tracks which clients of the at least two clients are active; and
   implement at least one of the following:
      a client separator function that keeps the at least two clients separated for a specified time duration;
      a client rendezvous function that makes asynchronous clients of the at least two clients temporally synchronous clients that actively use the instrument at the same time; or
      a client observer function that provides context information used to determine when to join two or more of the at least two clients.

2. The non-volatile memory device of claim 1, wherein the software lock function comprises a timer based self-release mechanism that prevents dead locks.

3. The non-volatile memory device of claim 1, wherein the software lock function provides active clients of the at least two clients a lock that allows the active clients to use the instrument.

4. The non-volatile memory device of claim 1, wherein the client rendezvous function joins clients that start operating at most within a specified time period of each other.

5. The non-volatile memory device of claim 1, wherein the client observer function observes configuration states of test plans executed by at least the instrument, and estimates an average time for each configuration state of the observed configuration states.

6. The non-volatile memory device of claim 1, wherein the client rendezvous function joins clients of the at least two clients identified to be running compatible test plans.

7. The non-volatile memory device of claim 3, wherein the software lock function provides the lock to an inactive client among inactive clients of the at least two clients that has been waiting the longest.

8. The non-volatile memory device of claim 3, wherein the lock corresponds to more than one active client.

9. A measurement system comprising:
   a test instrument configured to concurrently serve a plurality of clients, wherein to concurrently serve the plurality of clients, the test instrument is configured to:
   track which clients of the plurality of clients are active; and
   perform at least one of the following:
      keep the plurality of clients separated for at least a specified time duration;
      make asynchronous clients of the plurality of clients temporally synchronous clients that actively use the instrument at the same time; or
      provide context information used to determine when to join two or more of the plurality of clients.

10. The measurement system of claim 9, further comprising the plurality of clients, wherein at least one client of the plurality of clients comprises a:
    device under test (DUT); and
    a control system configured to control the DUT and the measurement instrument.

11. The measurement system of claim 9, wherein to track which clients are active, the test instrument is configured to provide a lock to selected inactive clients of the plurality of clients designated to become active clients, wherein the lock allows the active clients to use the test instrument.

12. The measurement system of claim 9, wherein the test instrument is configured to join clients of the plurality of clients that start operating at most within a specified time period of each other.

13. The measurement system of claim 9, wherein the test instrument is configured to observe configuration states of test plans executed by at least the instrument, and estimate an average time for each configuration state of the observed configuration states.

14. The measurement system of claim 9, wherein the test instrument is configured to join clients of the plurality of clients identified to be running compatible test plans.

15. The measurement system of claim 11, wherein the test instrument comprises a timer based self-release mechanism configured to release the lock upon expiration of the timer and prevent dead locks.

16. The measurement system of claim 11, wherein the test instrument is configured to provide the lock to an inactive client of the selected inactive clients that has been waiting the longest.

17. The measurement system of claim 11, wherein the lock corresponds to more than one active client.

18. A test instrument comprising:
    a signal generator configured to generate test signals and provide the test signals to devices under test (DUTs);
    a signal analyzer configured to receive and analyze output signals generated by the DUTs according to the test signals; and
    a processing element configured to:
      track which DUTs of the plurality of DUTs are active; and
      perform at least one of the following:
        keep respective accesses to the test instrument by the plurality of DUTs separated by at least a specified time duration;
        make asynchronous DUTs of the plurality of DUTs temporally synchronous DUTs that actively use the test instrument at the same time; or
        provide context information used to determine when to join two or more of the plurality of DUTs.

19. The test instrument of claim 18, wherein the processing element is further configured to:
    autonomously run the plurality of DUTs asynchronously for the signal analyzer and synchronously for the signal generator.

20. The test instrument of claim 18, wherein the processing element is configured to:
    autonomously run the plurality of DUTs asynchronously for the signal analyzer and the signal generator; and
    autonomously run at least a subset of the plurality of DUTs synchronously.

* * * * *